United States Patent [19]
Gibbs

[11] Patent Number: 5,889,765
[45] Date of Patent: Mar. 30, 1999

[54] BI-DIRECTIONAL COMMUNICATIONS NETWORK

[75] Inventor: Graeme Gibbs, Waltham Abbey, Great Britain

[73] Assignee: Northern Telecom Limited, Montreal, Canada

[21] Appl. No.: 798,773

[22] Filed: Feb. 11, 1997

[30] Foreign Application Priority Data

Feb. 12, 1996 [GB] United Kingdom ............... 9602809

[51] Int. Cl.⁶ ............................................... H04L 5/14
[52] U.S. Cl. ........................ 370/294; 370/337; 370/519; 370/395
[58] Field of Search ............................... 370/508, 519, 370/252, 337, 395, 443, 458

[56] References Cited

U.S. PATENT DOCUMENTS

| 5,448,567 | 9/1995 | Dighe et al. | 370/395 |
| 5,742,764 | 4/1998 | Asoh | 370/337 |
| 5,761,197 | 6/1998 | Takefman | 370/337 |
| 5,805,633 | 9/1998 | Uddenfeldt | 370/337 |
| 5,806,003 | 9/1998 | Jolma | 370/337 |

*Primary Examiner*—Jason Chan
*Assistant Examiner*—Alexander Boakye
*Attorney, Agent, or Firm*—Lee, Mann, Smith, McWilliams, Sweeney & Ohlson

[57] ABSTRACT

A bi-directional communications network is disclosed, and in particular a TDM/TDMA protocol for the shared coax medium downstream/upstream resource. This protocol provides a very efficient technique for resource sharing in the access network of HFC systems. A method of communicating information between a central station and a plurality of terminals in a distribution network, is also disclosed. This invention allows the ranging of the terminals of unknown distance from the central station within an upstream ATM cell slot dynamically allocated for the marshalling process by the central station.

4 Claims, 9 Drawing Sheets

BI-DIRECTIONAL COMMUNICATIONS NETWORK

FIELD OF THE INVENTION

The present invention relates to a bi-directional communications network in general, and in particular relates to a cable communication system.

BACKGROUND OF THE INVENTION

Traditional hybrid fibre-coax (HFC) architectures have been deployed with a downstream one-way-only broadcast service requirement, with no, or limited cable return path. Recently, as network providers and equipment manufacturers have started to explore the options for high capacity two-way services, the limitations of the original system choices have become apparent. A symmetrical bandwidth or a more symmetric bandwidth than at present is described. This will allow the development of high capacity 2-way services. Examples of such two way (more symmetric) services include video telephony and work-at-home data applications (as opposed to INTERNET browsing). Such 2-way or highly interactive services enable more economic growth of HFC networks in the future.

Data services used for downloading from central servers are asymmetric, but can be highly symmetric if they are used for work-at-home or remote "grass roots" publishing applications. In the latter case, each subscriber's "download" becomes the publisher's "upload". LAN extension applications, assuming Ethernet 10BaseT connections within the home requires instantaneous 2-way bandwidths of up to 10 Mb/s, if the HFC plant is not to be the bottleneck although the net throughput would be considerably less than this. Preferably latency must be kept low, nominally less than 10 msec, particularly in a LAN environment. As opposed to this, Internet surfing may also benefit from a large downstream capability, however in this case a few 10's of kb/s upstream is likely to be sufficient for this application.

Video conferencing bandwidths are symmetric although lower than those for data or entertainment—384 Kb/s to 2 Mb/s. Holding times however could be several hours, which impacts the upstream capacity engineering of the access plant. To the extent that any of the data or video services are used for business applications, they would have to have a reliability requirement approaching that of telephony today. The reliability requirement also affects the engineering choices in the access plant, requiring a small failure group size.

The upstream capacity is limited in hybrid fiber coaxial designs by the characteristics of the spectrum—the low end of the band in the 5 to 42 MHz region—to which upstream traffic has been assigned in cable industry practice. This spectrum has problems with a high noise floor due in part to ingress by subscriber's cable plant noise. The presence of noise limits both the absolute amount of bandwidth available for upstream use, and the maximum bandwidth of any single channel. In practice, the limit is about 5 to 8 channels of 2 MHz each, which results in about 10 to 16 Mb/s of total bandwidth in a TDMA system, factoring in modulation index and overheads. Furthermore, the modems need to be dynamically agile to be able to seek quiet areas of the spectrum as interference conditions change.

The use of the high end of the band (350 to 500 MHz) allows larger contiguous blocks of bandwidth and such bandwidth is subject to less noise sources. Higher attenuation losses are incurred due to the higher frequencies, but the reduced transmission path distances caused by placing the electro-optic conversion plant deep in the access network (i.e. closer to the subscriber) avoid the need for expensive additional bi-directional amplifiers.

A design that uses remote digital electronics (an access node) to provide high upstream bandwidth to a group of around 240 subscribers provides higher reliability than existing analogue systems and constrains the failure group size to limits normally acceptable in the industry for telephony. Average upstream bandwidth per subscriber can be further increased by further reducing the number of customers served by the access node. This can be acheived by dividing the amount of feeder coax served i.e. reducing the number of "coax legs" from any single access node. This has the effect of reducing both noise ingress and the total demand for upstream bandwidth on that access node.

To accommodate a diverse service mix such as LAN, video conferencing, games and VOD, it would be desirable to have a transport layer which utilizes the ATM format to carry all information and signaling between the central office and the home. The ATM format has been extended to the periphery of the broadband network since it provides a simple, consistent method for handling virtual circuits of different bandwidths and of different delay, burst characteristics and Quality of Service requirements over a single network. Further, ATM supports evolution of the MPEG bit rate as silicon speeds increase and more sophisticated decoding techniques are developed.

A cable system should preferably have the following key characteristics: the ability to co-exist with existing broadcast cable architectures; high capacity in both the downstream and upstream direction for switched digital services, achieved by inserting and extracting bandwidth deep in the outside plant, closer to the subscriber than traditional headend broadcast architectures; the ability to support a wide range of video and data services without preconfiguration; support of low latency upstream requirements; flexible deployment options to allow for increasing penetration of high upstream bandwidth interactive services.

The architecture of multiple users sharing bi-directional bandwidth on a shared access medium leads to a number of implementation possibilities: firstly it is assumed that there is little community-of-interest between adjacent subscribers and any such traffic can be "hairpinned" via the core network. This allows simplification of the system to a point to multi-point (rather than a multi-point to multi-point). In the downstream direction (point to multi-point) traffic is "broadcast" and is received at all subscribers. A single downstream FDM channel could be allocated (either statically or dynamically) to each subscriber within the coax leg to limit access, but this requires a large number of different frequency modems at the access node and either frequency adaptable modems or a large number of variant outstation types. It also complicates configuration of the network and obviously limits the peak downstream bandwidth to any one subscriber. Thus a TDM method is preferable to allow bursty downstream bandwidth. This could either be a single very broad TDM channel or a small numbers of less broad TDM channels, each one allocated statically to a block of subscribers—which implementation is adopted makes no difference to this invention.

In the upstream direction (multi-point to point), various possibilities can be considered, amongst them: FDMA, TDMA and CDMA. FDMA on its own is ruled out for the same reason as FDM. CDMA allows all users access to the whole bandwidth, but the cost/complexity of CDMA where the subscribers/outstations are capable of continually varying data rates outweighs the benefits. Due to the uniform ATM PDU size, a TDMA system based on ATM presents a potential solution where each TDMA timeslot holds a single ATM cell and use of such timeslots could be individually allocated in a dynamic fashion. This allows simple sharing of bandwidth between a number of users, thus allowing concentration of CBR type connections (e.g. voice calls) and statistical gain of bursty connections. However, to limit the bandwidth required of a single upstream modem and to allow work-around known interferers, it is proposed to support a limited number of TDMA channels operating at separate frequencies. An individual subscriber would be statically or semi-statically assigned to a TDMA channel. While this system could be described as FDMA/TDMA, the present invention does not differentiate between subscribers operating at differing frequencies and therefore TDM can be used downstream and TDMA can be used upstream.

As is known, TDMA systems often have marshalling "slots"—gaps in upstream traffic which are used to accommodate the unknown round trip delay when outstations first "sign on". The present invention relates to a system whereby the basestation commands an outstation (or group of outstations) to transmit a known marshalling sequence inside a known marshalling window. Only unmarshalled outstations need respond. Outstations only respond when commanded to by the basestation. The existence of any signal is used to detect unmarshalled outstations. Once a unique unmarshalled outstation has been resolved, then the phase and amplitude of the received known marshalling sequence is used to adjust the launch phase and amplitude of the outstation. The marshalling window needs to be long enough to accommodate variations in round trip delay plus the length of the marshalling sequence chosen to ensure accurate phase/amplitude measurements.

For systems with an appreciable round-trip delay, such as cable networks, use of a dedicated marshalling window can amount to a significant usage of the TDMA bandwidth.

One solution that is to increase the "frame length" i.e. increase the period over which there is a regular marshalling slot. However, this leads to slower marshalling and increased latency of other functions which rely on a small frame length.

It is an object of this invention is provide a TDMA protocol operable in a cable network wherein the marshalling slots do not take up appreciable bandwidth.

SUMMARY OF THE INVENTION

In accordance with the present invention, there is provided an ATM-TDMA system, wherein upstream ATM cell slots are dynamically allocated, and wherein marshalling is achieved within an upstream traffic cell slot.

In accordance with another aspect of the present invention, there is provided an ATM-TDMA system, wherein upstream ATM cell slots are dynamically allocated, and wherein marshalling is achieved within an upstream traffic cell slot. according to the inequality:

$$td+(lm/b)<(ls/b)$$

where:
td is the maximum differential round-trip delay;
lm is the minimum length (in bits) of the marshalling sequence necessary to allow correct marshalling;
b is bit rate of upstream traffic;
ls is the length of cell slot minus guard band;
The basestation has control over the timing of traffic cell slot allocation and the timing of marshalling responses, so that the slot to be used for marshalling is simply removed from the cell allocation mechanism for the time during which a marshalling response has been commanded.

As marshalling responses can be limited to very small proportion of the overall marshalling opportunities, this latter approach maximises the use of upstream channel capacity for traffic.

In accordance with another aspect of the invention, there is provided a method of communicating information between a central station and a plurality of terminals in a distribution network, comprising the steps of: at the central station, determining downstream TDM frames, for transmission of distribution information and overhead information from the central station to the plurality of terminals, and upstream TDMA frames, for transmission of information in respective time slots from the terminals to the central station, wherein upstream ATM cell slots are dynamically allocated, wherein marshalling is achieved within an upstream cell slot.

In accordance to a still further aspect of the invention there is provided a method of communicating information between a central station and a plurality of terminals in a distribution network, the method comprising the steps of: at the central station, determining downstream TDM frames, for transmission of distribution information and overhead information from the central station to the plurality of terminals, and upstream TDMA frames, for transmission of information in respective time slots from the terminals to the central station, wherein marshalling is achieved within an upstream cell slot according to the inequality:

$$td+(lm/b)<(ls/b)$$

where:
td is the maximum differential round-trip delay;
lm is the minimum length (in bits) of the marshalling sequence necessary to allow correct marshalling;
b is bit rate of upstream traffic;
ls is the length of cell slot minus guard band.
The timing of cell slot allocation and the timing of marshalling responses can be controlled by the central station, whereby the slot to be used for marshalling is removed from the cell allocation mechanism for the time during which a marshalling response has been commanded.

BRIEF DESCRIPTION OF THE DRAWINGS

In order that a greater understanding of the invention be attained, reference shall now be made to the description and the figures as shown in the accompanying drawing sheets, wherein.

Annex 1 provides glossary of terms.

DETAILED DESCRIPTION

Figure 1:
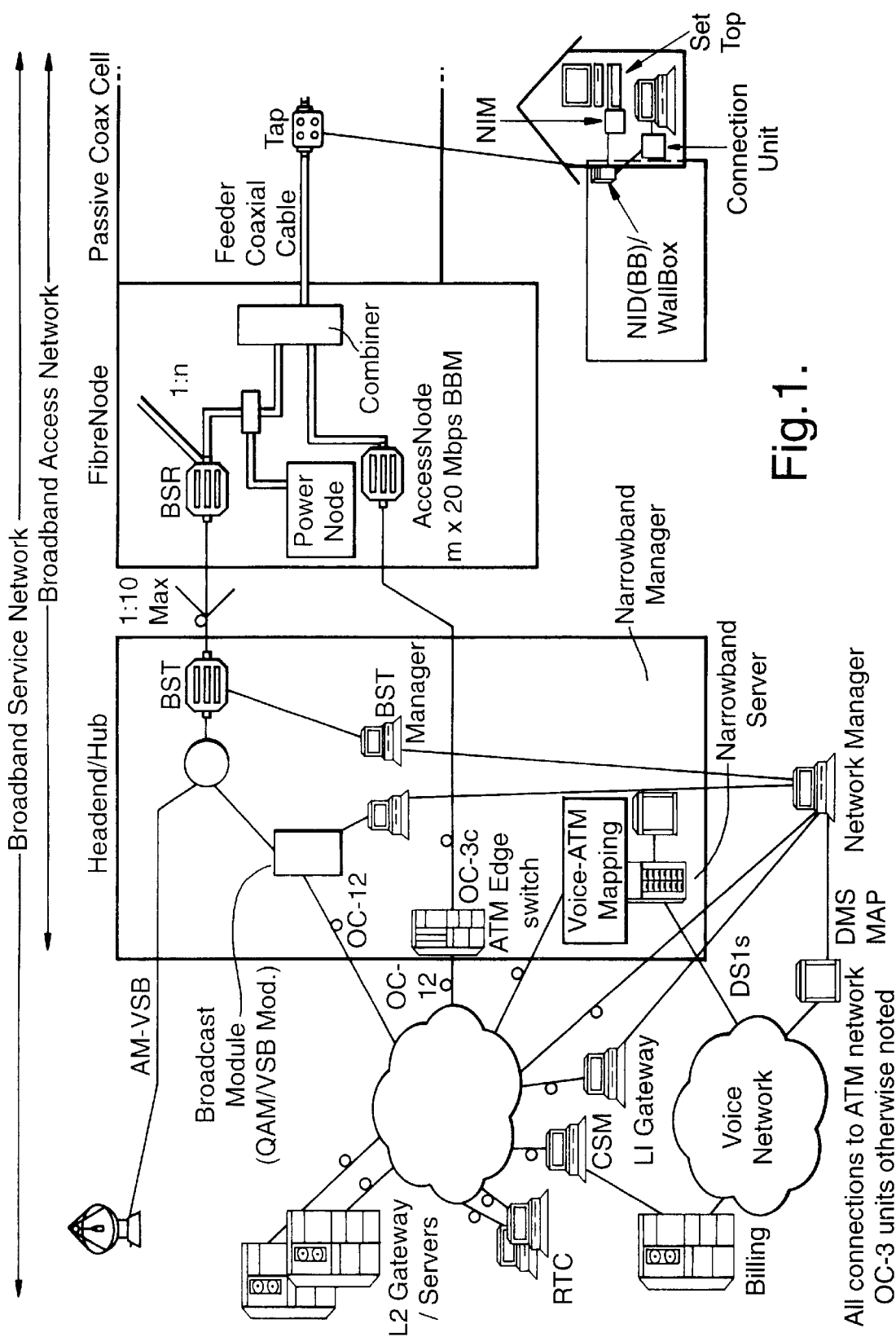
FIG. 1 schematically illustrates a broadband service network.

Broadband networks need to support a mix of broadcast and interactive services, including data, in order grow in the future. Broadcast services include both analogue and digital formats, and interactive services include video on demand, Internet access, two way data, video telephony, voice telephony and telemetry for energy management and security. FIG. 1 shows the main components of such a network.

The architecture described is suitable for deployment of interactive and broadcast services to suburban areas using a combination of hybrid fiber coax and remote digital electronics to provide the bandwidth, low latency, availability (i.e. small failure group sizes) and at competitive cost levels. Digital and analogue broadcast services are carried from a headend in 6 MHz or 8 MHz channels to each home where channel selection is made at the set-top. These services are carried on 550 MHz or 750 MHz analogue fiber to a remote EO point ( as indicated by BSR in FIG. 1) which then serves several (80–240) home groups via coaxial cable. Digital video program channels are carried on 6 MHz or 8 MHz RF channels using 64 QAM modulation, which carries 3 to 9 program channels at 8 Mb/s to 3 Mb/s respectively per RF channel. Interactive services are connected to the distribution coaxial cable from a compact amplifier-sized device referred to in FIG. 1 as an access node. This device performs the transition between optical signals on the fiber and electrical signals on the coaxial cable, summing the signals at the frequencies carrying interactive data with the signals at the frequencies carrying broadcast data, as will be discussed with reference to FIG. 7.

The access network of a cable system is the equipment and infrastructures performing the transmission, multiplexing, concentration and broadcasting of service/application information flows between the end users of a given area and the rest of the delivery system (core network and servers), relevant control and management functions and transport of other services. The access node performs the adaptation between the Core Network and the access network. It processes the information flow such that they can be transported through the selected distribution networks. A fibre link provides bi-directional point to point digital transport between the CO and the access nodes (one fiber per direction). A Feeder Coax provides bi-directional point to multipoint transport for all services between the access node and the set top units. This is an analog transmission medium carrying digitally modulated signals. TDM/TDMA (Time Division Multiplexing/Time Division Multiple Access) transmission schemes are preferred in this shared coax medium, both for downstream/upstream resource sharing. TDMA is required in the upstream direction to account for different delays in transmission from set-top units which are physically located at various distances from the access node. The TDMA protocol manages the selection of timeslots and delay offsets for each set-top unit to ensure their upstream signals to the access node do not interfere with each other.

Figure 2:
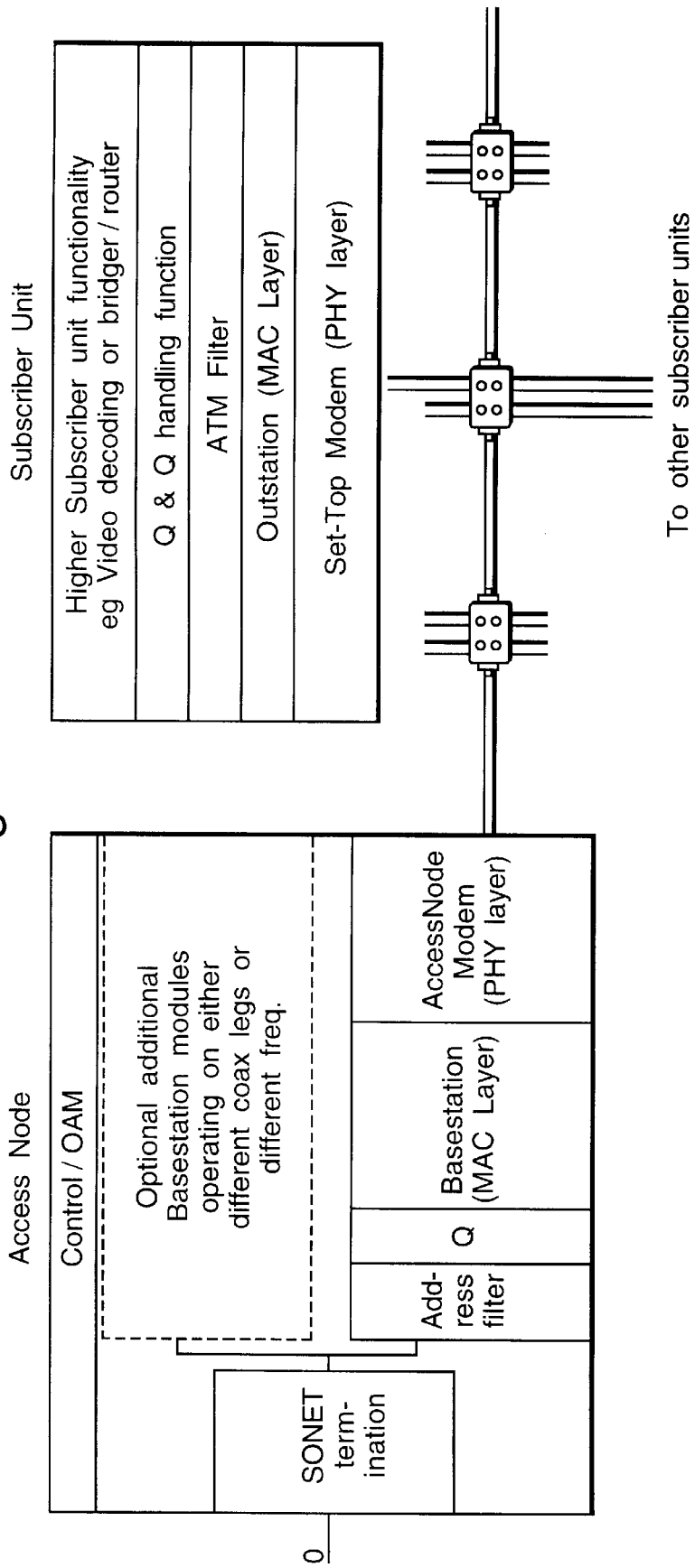
FIG. 2 illustrates the relationship of basestation within the Access Node and outsation within the subscriber unit and their respective modems.

The access node communicates with the set top units situated in subscribers premises via the feeder coaxial cable which is essentially a common bus for all set-top units. Thus, in the downstream direction communications is point to multipoint, while in the upstream direction communications is multipoint to point. Each access node contains a basestation and each set-top unit contains an outstation. It is these basestations and outstations that manage the TDM/TDMA protocol. Each basestation connects to an access node modem, and each outstation connects to a subscriber set-top unit modem. An example of this is shown in FIG. 2. The access node may be connected to more than one physical section of feeder cable ("coax leg") and so the implementation may choose to control each coax leg with a separate basestation or alternatively a number of coax legs may be common to a single basestation. Furthermore within any single coax leg there may be a single basestation controlling all outstations, or alternatively a number of different basestations may operate through broadband modems at different frequencies.

Figure 9:
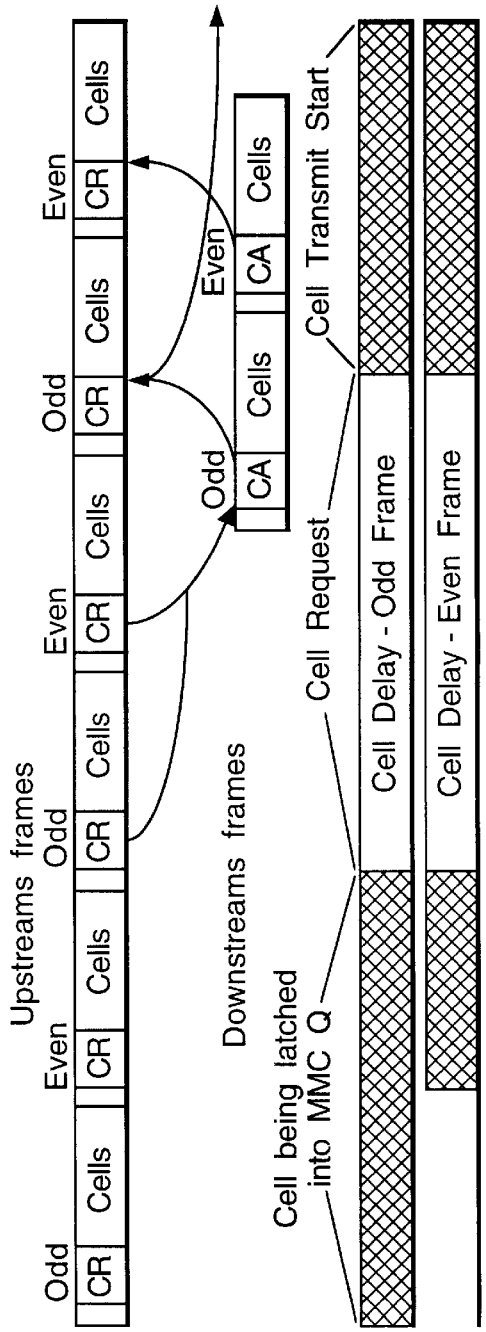
FIG. 9 illustrates a cell allocation sequence.

In this implementation a data rate of 20.48 Mbps can be employed in both the upstream and the down stream directions to accommodate broadband interactive services. The TDM/TDMA protocol makes use of 125 microsecond frames in both directions, although the structure of the frames is different in each direction. As only user traffic in ATM cells can be supported by this protocol, the protocol has been designed to maximize the number of ATM cells that can be supported in each direction. The particular frequencies, rates, frame lengths and frame formats used may be varied dependent on user requirements, data flow etc. FIG. 9 shows a suitable TDM/TDMA structure for the upstream and downstream signals.

To support Multi Megabit Interactive (MMI) services on HFC, the allocation of various spectrum bands may vary in different countries. The following description expands on the North American spectrum allocation as an example to illustrate how frequencies can be allocated on the spectrum to satisfy the requirement of MMI.

Figure 3:
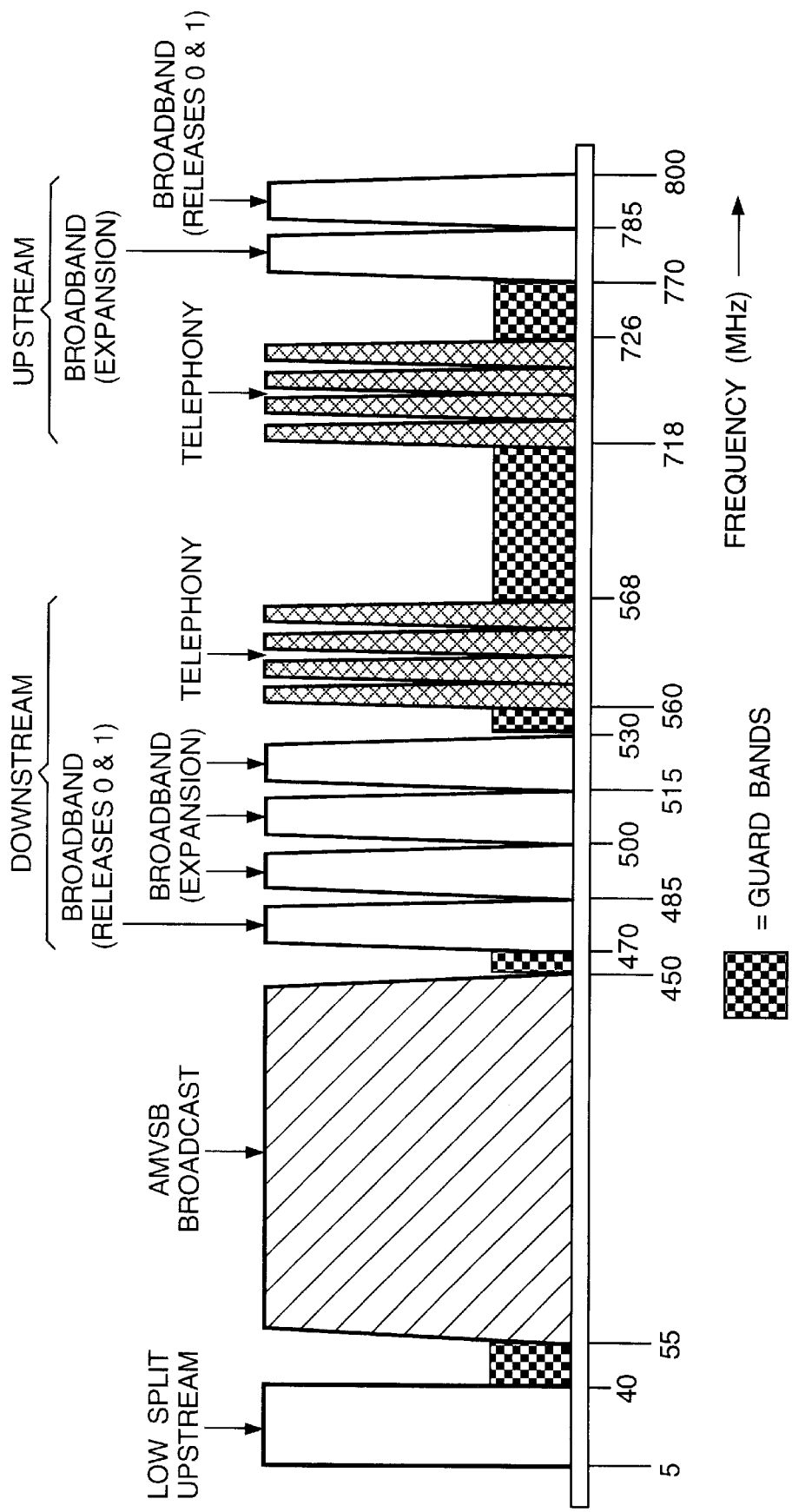
FIG. 3 illustrates a frequency spectrum for downstream and upstream signals in a cable network.

FIG. 3 shows the spectrum on the coax part of the HFC. Present and projected frequencies are shown. Downstream broadband traffic will exist between 470 and 530 MHz, while the upstream broadband will exist between 770 and 800 MHz. The use of the high end of spectrum for upstream data is preferred to provide greater capacity and improved noise margins with respect to the low end. It is also recognised that high burst data services such as "peer to peer data" and "at home www (world wide web) pages" may not be realizable if the low end is used for the upstream data transmission. Even some services, such as video telephony, which are technically feasible may not be viable economically. For example, the use of high end in this case results in a cost effective plant architecture. On the other hand, the low split design requires the plant to be split too many times. The spectrum for interactive services with large upstream bandwidth will utilise the spectrum otherwise used for minority interest group channels. Modems in the access node and the set-top unit use for example 15 MHz of bandwidth per direction (downstream and upstream) on the coax. The low split upstream (5–40 MHz) is not used, to ensure future interoperability with existing CATV upstream signals (PPV, remote monitoring, low bit rate data services). The low split bandwidth is passed by all elements of the broadband services network.

The broadband and telephony data streams can be transmitted on the forward and return paths using a Differentially encoded Quaternary Phase Shift Keyed (DQPSK) RF carrier (QAM or other modulation schemes may be used instead, based on channel characteristics). Access is via a Time Division Multiplex (TDM) in the forward path and Time Division Multiple Access (TDMA) on the return path. Duplex transmission is achieved by frequency division, with forward and return frequencies allocated as shown in FIG. 3.

The access node uses one basestation module/broadband modem per coax span, to communicate with the set-top units. Each set-top unit also contains an outstation module/ broadband modem which communicates to the access node The two modems (i.e. access node and set-top unit modems) have a raw data rate of 20.48 Mbps (including all ATM and TDM/TDMA protocol overheads). Thus each access node modem requires 13.3 MHz (20.48 Mbps/1.5 bits/Hz) of spectrum. The access node and set-top unit modem have both been allocated 15 MHz of spectrum to allow a margin above the theoretical requirements.

The TDMA protocol used relies on the outstation upstream bursts arriving at the basestation in the expected time slot within a certain phase and receive power uncertainty. This is achieved using marshalling. There are two marshalling processes: Attachment marshalling and steady state marshalling:

Attachment marshalling is used to: identify and "attach" each set-top unit on power up/connection, setting the range, phase and amplitude of transmiitting set-top unit to allow correct TDMA operation and denying attachment to set-top units which are not recognized as valid.

Before a cycle of attachment marshalling starts, it is not known whether there are any unmarshalled outstations within the coax cell. The modem technology chosen has removed the need for a burst preamble: carrier phase alignment is not necessary due to the DQPSK encoding used, however, each outstation must have its symbol clock phase adjusted to align with basestation sample clock. Therefore any unmarshalled outstations have unknown identity, unknown range and unknown symbol clock phase. The unknown range leads to an unknown time of arrival of any response with an unknown receive amplitude.

Figure 4:
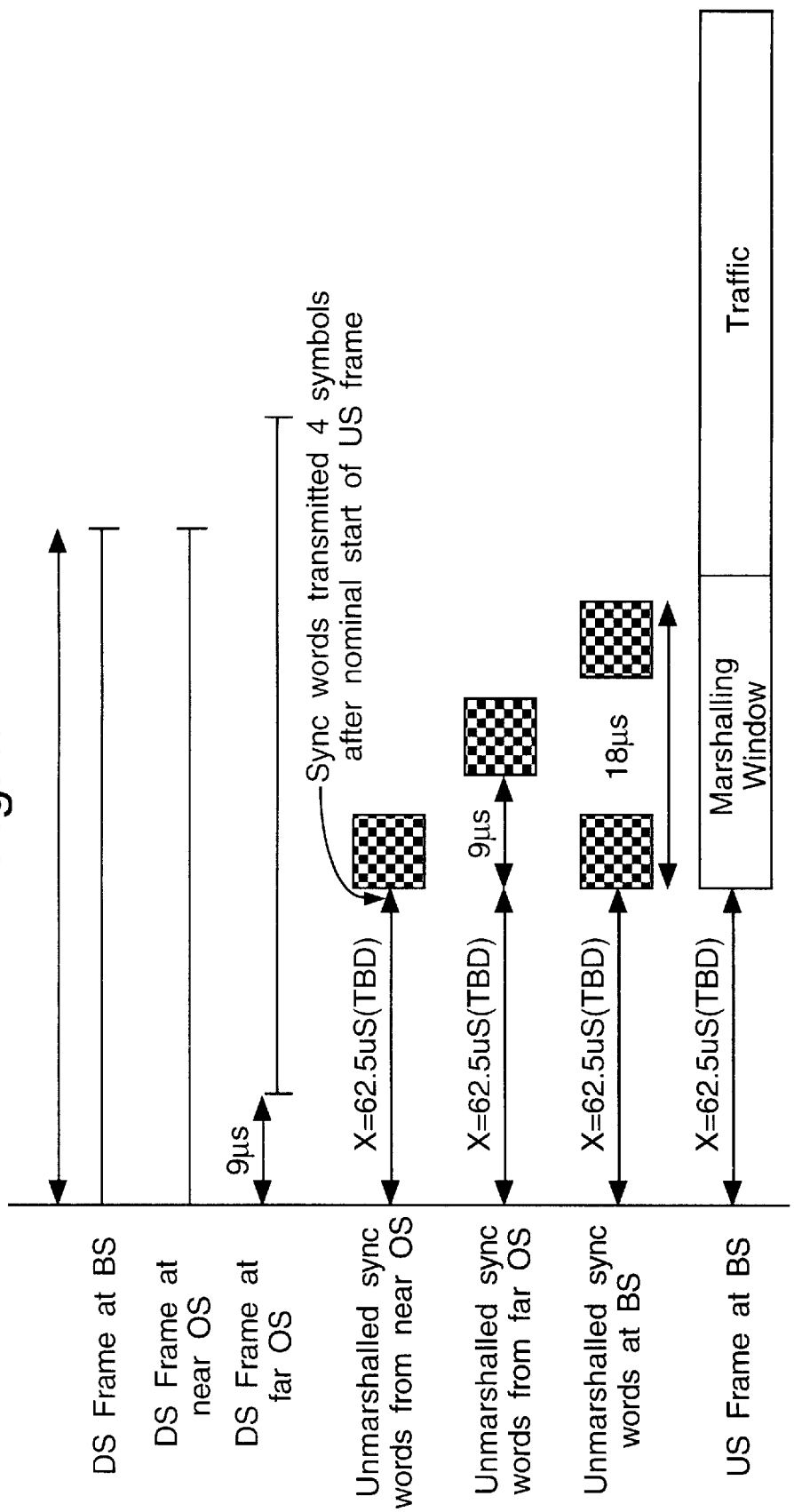
FIG. 4 shows the effects of transmission delay on arrival of marshalling response.

The attachment marshalling process consists of inviting an outstation to transmit a certain marshalling response within a marshalling window, if certain conditions are met. The marshalling window must be large enough to accommodate the length of the marshalling response, the uncertainty of arrival time and have sufficient guard band to prevent inter symbol interference with subsequent transmissions. The uncertainty of arrival of marshalling responses will be equal to the difference between the maximum and the known minimum round trip transmission delay. In this case the known minimum is zero. FIG. 4 shows the effects of transmission delay on arrival of marshalling response.

To detect whether there are any unmarshalled outstations within the coax cell. the initial marshalling request is for all unmarshalled outstations to transmit. Due to contention, incorrect launch phase or too large a launch amplitude it is quite possible that the data is unreadable at the basestation. Therefore a received amplitude greater than a selected threshold is used to determine whether to proceed further. Once it has been determined that one or more unmarshalled outstations exist, further requests for response from unmarshalled outstations are made using increasing selective addressing. The method chosen uses a binary-tree selection process, to narrow the responses down to an individual outstation whose MAC address is now known.

Using this known MAC address, the outstation can be selectively requested to transmit known responses with changes to transmit amplitude ("coarse leveling") and then at different transmit phases. Once the transmit amplitude and phase are correctly set, the data transmitted by the outstation can be read by the basestation and the arrival of the marshalling response message (a sequence with low autocorrelation) can be used to set the range offset in terms of symbols ("ranging"). At this point any outstation preequalizer training is acheived with the basestation feeding back coefficient values as necessary. An attached set-top unit is then allocated an upstream cell request channel and a short ID used for upstream cell slot allocation, and is considered active.

Steady state marshalling is used to maintain an outstation from drifting outside the acceptable offset delay and launch power envelope and is a sub-set of attachment marshalling in as much as the identity is known, and amplitude/phase only need incremental adjustment. Thus the window needed for steady state marshalling is much smaller than that needed for attachment marshalling.

Figure 5:
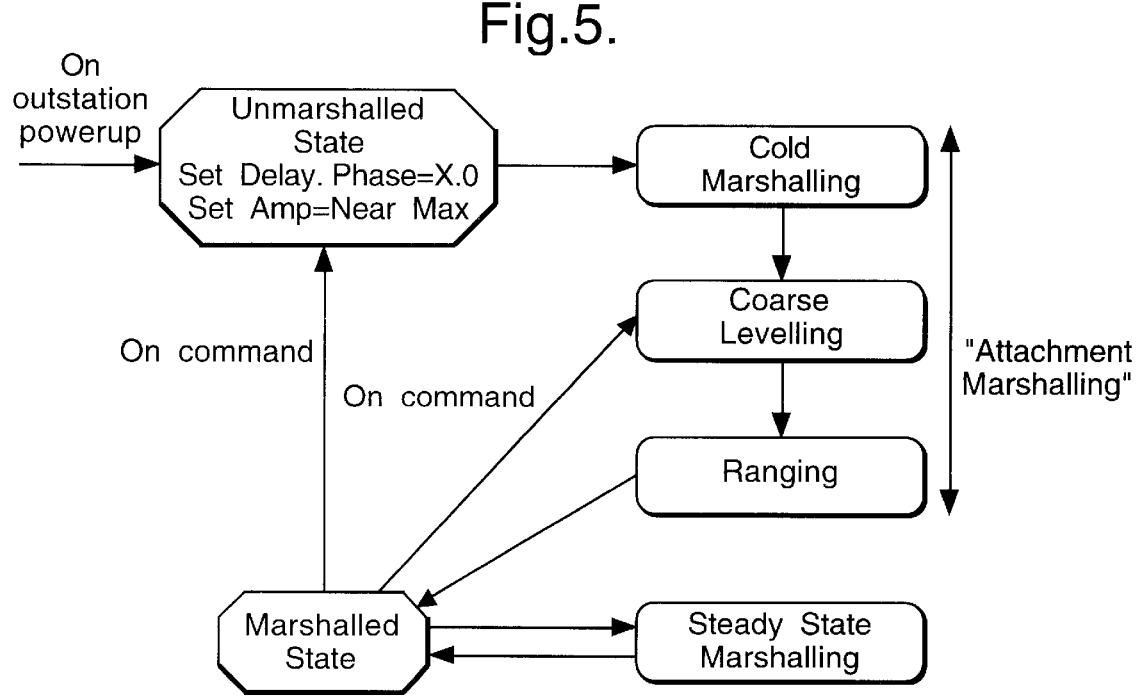
FIG. 5 illustrates the transition diagram for marshalling .

FIG. 5 illustrates the transition diagram for marshalling. The basestation only needs to check for unattached outstations on a periodic basis (e.g. once per second). The vast majority of occasions will result in no response and therefore no further marshalling windows are required. if a response is detected a number of windows are needed in quick succession to ensure rapid attachment marshalling. If the window in the traffic for attachment marshalling responses was a fixed periodic assignment, there would be an inefficient compromise between marshalling times an upstream traffic. Thus this invention which allows flexible and rapid provision of a marshalling window due to its immediate control over use of traffic slots provides optimal use of upstream bandwidth.

The marshalling process can reliably be used on coax spans up to 2000 m long. Beyond 2000 m the delay differences can be too great to be handled by the TDM/TDMA protocol implemented. Increasing the maximum delay difference that the protocol can handle would decrease its efficiency in terms of ATM cell transport. The maximum round-trip delay inherent in the protocol is sufficient for the application targeted.

Once the upstream frame offset for an outstation is programmed, an outstation is provisioned to transmit within a unique sequence or sequences of symbols within the upstream frame. In order to achieve the DQPSK modem technology used for this system, between the last symbol of a data burst from one outstation and the first symbol of a data burst from the next outstation, there shall be a guard slot to prevent inter-burst interference. The first symbol of every data burst shall be a reference symbol as the data is differentially modulated. All successive symbols in the data burst shall be independent of the physical layer.

Figure 6:
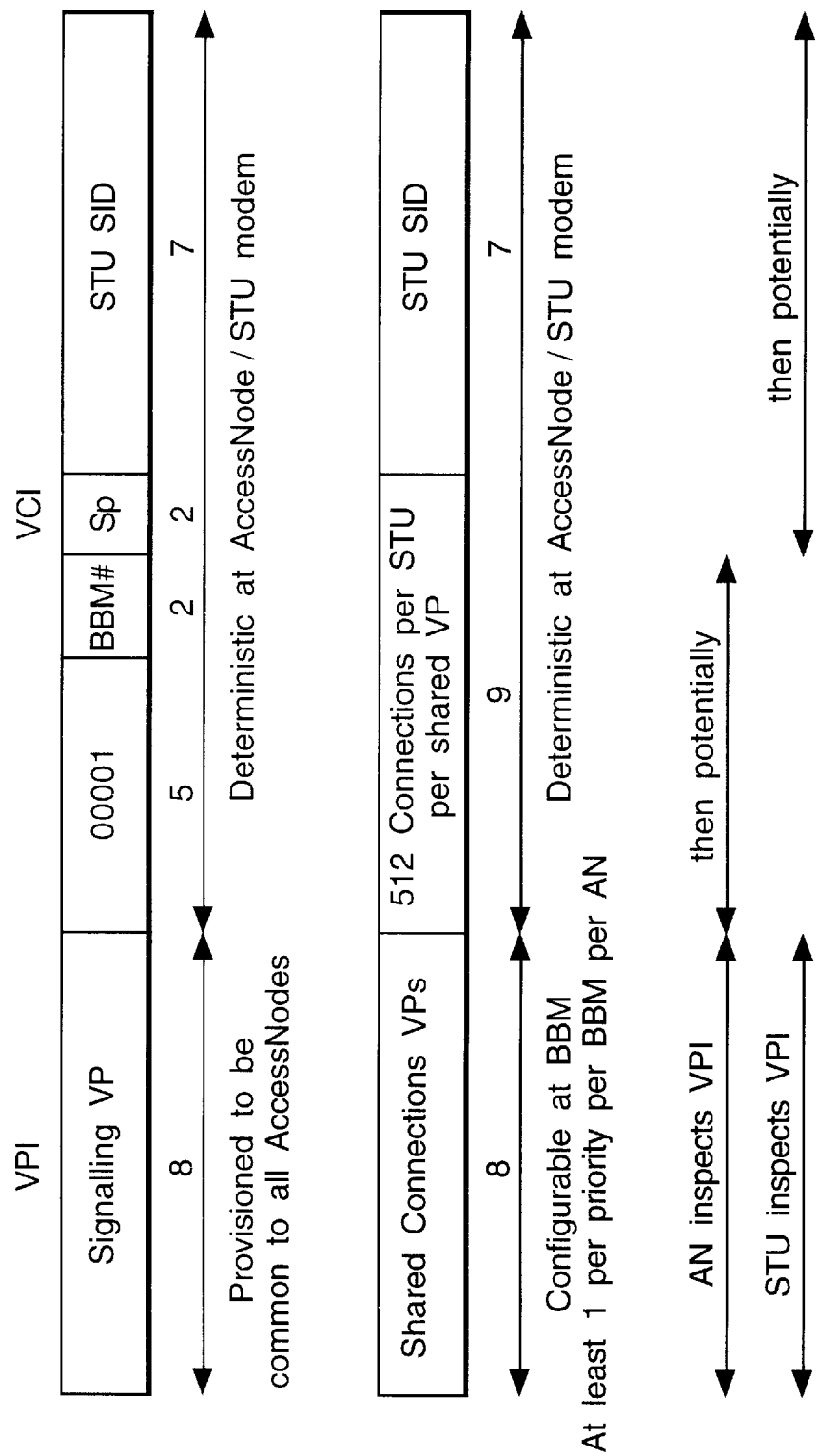
FIG. 6 illustrates ATM address segmentation.

Referring now to FIG. 6, in order to simply route cells downstream through the Broadband Access Network, a hierarchical ATM addressing scheme is employed. To allow simple VP routing through the Broadband Services Network, all ATM signalling connections are condensed into a single VP, and routed in the Broadband Access Network on VCI information. Similarly a single VP may be used to support all high priority connections to all STUs on a given coax span; cells belonging to individual connections being selected by the correct STU outstation based on the VCI identity. Similarly again a single VP may be used to support all low priority connections to all STUs on a given coax span. Private VPs are routed to individual STUs; broadcast cells will be received by all STUs on the network.

A sequential description of the data path follows:

In the downstream direction: Within the access node the SONET interface is terminated and the cell stream is descrambled. A check for a valid HEC is carried out and invalid cells are discarded. Physical layer OAM cells and access node OAM cells are extracted within an NTC function, and the downstream cell stream is broadcast to all broad band basestations within the access node. Each broad band basestation latches and queues downstream cells from the cell stream received from the SONET interface in accordance with its provisioned ATM address filters.

Each downstream broad band basestation shall have a queue handling function, that shall cause outgoing cells to be accessed high priority first on a First-In First-Out (FIFO) basis. Where no high priority cells are queued, low priority cells shall be accessed on a FIFO basis. Where no low or high priority cells are queued, the queue handling function shall generate an Idle cell. Cells are then transmitted continuously to a broadband modem in accordance with downstream frame format as shown in FIG. 9. The broadband modem shall modulate the signal and transmit to the coax.

The downstream signal is demodulated by all STU modem receivers tuned to the particular broadband modem frequency and each cell with an appropriate address is latched by the outstation and passed to the set-top box unit for processing.

In the Upstream direction: The STU internal interface to the Broadband Outstation Module operates as two Queues, into which the STU writes 53 byte cells. Each Broadband Outstation Module maintains two Queues: High and Low delay priority.

Each Broadband Outstation Module has a queue handling function, that causes outgoing cells to be accessed in a similar fashion to the base station. The Broadband Outstation Module prevents egress of cells onto coax with VPI/VCIs not in its VPI/VCI table. Upstream cells have a single byte BIP check calculated and appended to each cell (to allow upstream performance monitoring). The outstation transmits cells in TDMA slots in accordance with upstream format as shown in FIG. 9 only when authorized to do so. The outstation module shall pass the signal burst to the modem which modulates the burst and transmits it to the coax.

At the basestation the upstream signal is demodulated and the cells are queued in the access node. Each broad band basestation has a single queue with no indication of cell delay priority. Cells with an invalid HEC are discarded. Idle cells or empty cell slots are detected and discarded. The upstream cell flow control method results in cells queuing back at the outstation/STU when the aggregate required bandwidth over either the coax or fibre is greater than the actual bandwidth. The broad band basestation uses the fill level of its queue to regulate the cell allocation algorithm, so that it cannot ever overflow. The broad band basestation controls the flow back to the Broadband Outstation Modules, which can be achieved by ceasing/reducing cell allocation. The short term buffer size within the broad band basestation can reflect the latency of the flow control mechanism.

Cells from the broad band basestation queues are passed via an NTC function, where they are combined with physical layer OAM and injected OAM cells from the access node management functions, and assembled into an STS frame for transmission over a SONET link to the ATM switch.

Figure 7:
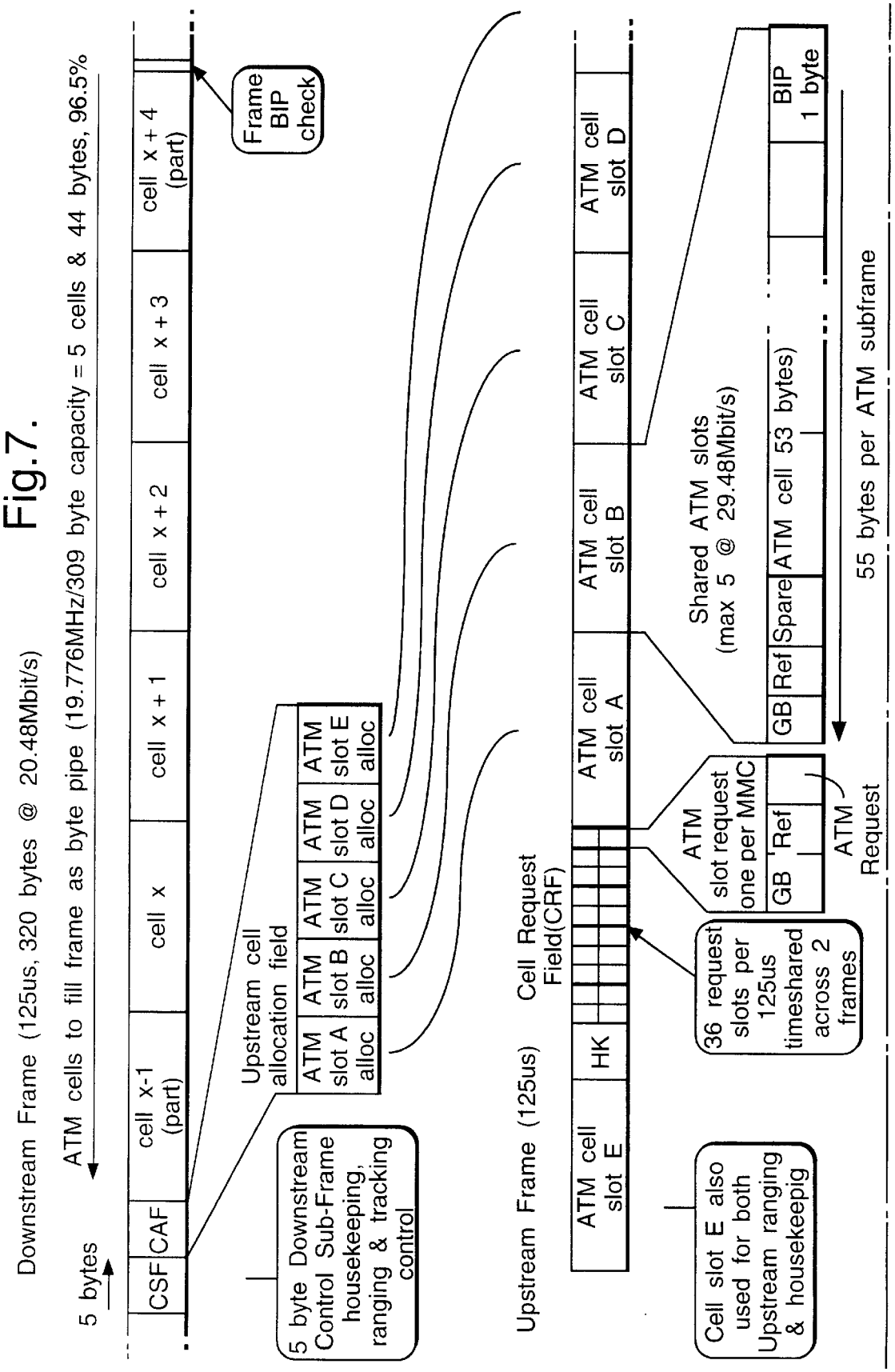
FIGS. 7 and 7(a) illustrate a TDM/TDMA frame structure for the upstream and downstream signals.
Figure 7A:
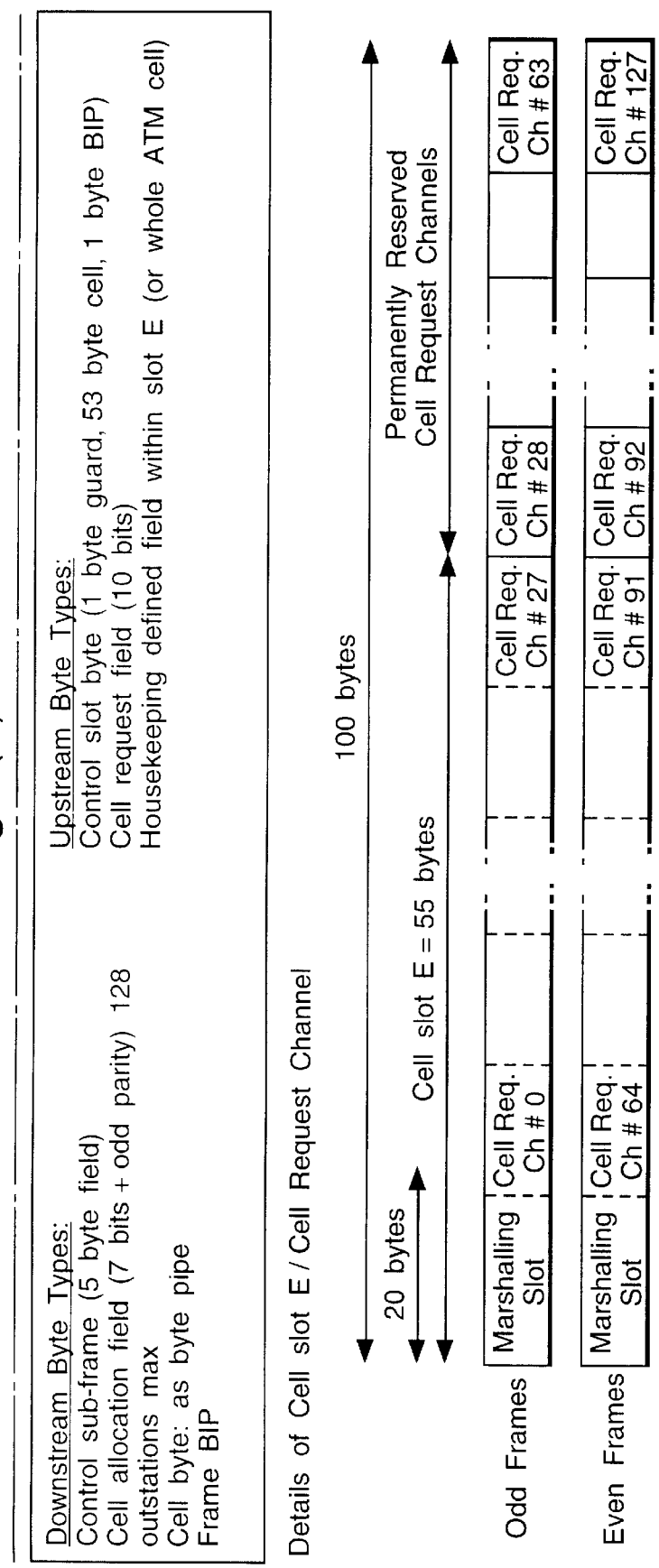

The coax TDM/TDMA frame structures are shown in FIG. 7. Using 125 μsec frames at 20.48 Mbps can provide 320 bytes per frame (20.48 Mbps/8 bits/byte*125 μsec=320 bytes). In the downstream direction: 5 bytes are used for the CSF (Control Sub Frame) which allows for housekeeping, ranging and tracking control; 5 bytes are used for the upstream CAF (Cell Allocation Field) which is used to inform outstations which upstream ATM cell slots to use in the following upstream frame; 1 byte is used for the BIP (Bit Interleave Parity) which is used for error detection; and 309 bytes are used for the ATM payload, which allows for 5 whole cells and 44 bytes of an additional cell. Thus ATM cells can be split across two consecutive frames. The outstation is able to reconstruct the ATM cells transmitted in this fashion. This enables very high bandwidth efficiency in the downstream direction (i.e. 309 of 320 bytes are used to transmit ATM cells—96.6% bandwidth efficiency). The access node basestation simply broadcasts all received cells to all set-top units, whilst each set-top unit processes only those cells addressed to it.

In the upstream direction the frame is divided as follows:
  55 bytes are used for cell slot E which is used for ATM payload as well as for other housekeeping purposes (marshalling, cell request channels);
  45 bytes are used as cell request channels. Each cell request channel is 10 bits wide, allowing for 36 cell request channels per frame. These request channels are used by the set-top units to request upstream ATM bandwidth (i.e. ATM cell slots);
  the remaining 220 bytes are used as 4 further ATM cell slots, each 55 bytes wide. Thus, each cell slot contains a 53 byte ATM cell as well as 1 byte of guard slot (required by the TDMA protocol), and 1 byte for BIP (for error detection).

This upstream traffic bandwidth is therefore 4 cell slots (A,B,C & D) every frame plus shared use of an additional cell slot (E).

Cell slot E can be used in two modes:
  1) To support up to 72 set-top units on coax spans up to 2000 m long, cell slot E will be used for ATM traffic or marshalling or control/status responses; and
  2) To support up to 127 set-top units on coax spans up to 500 m, cell slot E will be used for cell request channels and marshalling or control/status responses (i.e. cell slot E can not be used for ATM traffic in this latter mode).

Since all these functions within cell slot E (marshalling, control/status responses or ATM traffic) are mutually incompatible on a simultaneous basis, the use to which this slot is put must be different for different frames. On command from the processor for a marshalling or outstation register access (which are mutually exclusive by means of the protocols used), the hardware will inhibit use of cell slot E for ATM cells by writing 0 to Cell E allocation byte in the downstream frame immediately preceding the upstream frame during which a response will occur. At all other times, this cell slot will be available for the cell allocation algorithm to use as necessary. This dynamic use of the upstream frame for marshalling/housekeeping/traffic, allows the bandwidth available for traffic to be maximized.

In the upstream direction a mechanism is required to allow outstations to request upstream bandwidth and then transmit in the cell slots allocated to them. This process requires a fair allocation of bandwidth across all outstations attached to a basestation. Each outstation is allocated one 10 bit cell request channel every other frame upon marshalling. Thus there can be up to 72 active set-top units per access node basestation (36 cell request channels per frame×2 frames) without using cell slot E for request channels. As cell requests are received over 2 frames, upstream allocations are also handled on a 2 frame basis in this implementation. The bandwidth assignment mechanism is as follows: The upstream cell request channel will be at a default point within the upstream frame e.g. outstations with SIDs 0 to 63 have cell request channels in odd frames, outstations with SIDs 64 to 127 have cell request channels in even frames. outstations with SIDs 63 or 127 have cell request channels immediately prior to Cell A etc. as shown in FIG. 7

Figure 8:
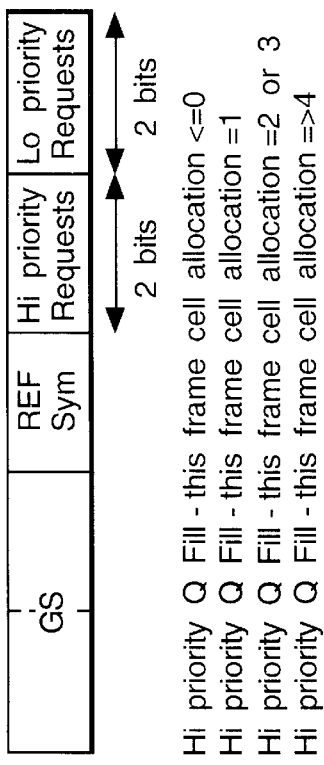
FIG. 8 illustrates data within cell request slots.

The 10 bit cell request channel has 4 usable bits, with the remaining 6 bits for use as a guard slot and reference symbol (as required by the modem technology). When an outstation wishes to transmit upstream, it uses its cell request channel to indicate how many cells are in each of its queues (each outstation has a low priority and a high priority ATM queue for upstream transmission). With 2 bits per queue, each queue request can have 4 states (these states are used to indicate queue fill e.g. 0 cells, 1 cell, 2–3 cells, 4 or more cells for the high priority queue/9 or more cells for the low priority queue). The meaning of the cell request will depend on the priority as shown in FIG. 8.

Once the basestation has received all requests over 2 frames it will allocate upstream cell slots as shown in FIG. 9. Once the allocation decision is made, the basestation indicates allocations to the outstations by placing the outstation's short identity (ID) in the downstream CAF corresponding to the upstream cell slot(s) that the outstation has been allocated. It is at this point that the Basestation can pre-empt the cell allocation mechanism and inhibit use of the default marshalling window/ATM cell slot for use by ATM traffic so that its use is available for an upstream marshalling response. The basestation does not keep track of requests from one allocation cycle to the next. It is up to the outstations to keep requesting cell slots until they are able to transmit the ATM cells in their queues. To prevent downstream errors causing upstream contention and hence loss of cells from two (or more) outstation modules, each downstream allocation byte contains a parity check mechanism. Where a cell slot(s) is unavailable/unused, its allocation byte shall be a null SID (0).

GLOSSARY

AM-VSB Amplitude Modulation- Vestigial side band
ATM Asynchronous Timing Mode
BIP Bit interleaved parity
BSR Broadband Services Receiver (A broadband analogue optical receiver)
BST Broadband Services Transmitter (A broadband analogue optical transmitter)
CAF Cell Allocation Field
CATV Community Antenna TeleVision (another term for cable delivered TV)
CBR Constant Bit Rate
CDMA Code Division Multiple Access
CO Central Office
CSF Common Sub-Frame
DQPSK Differential Quaternary Phase Shift Keying
EO Electrical Optical (conversion point)
FIFO First-In First-Out
FDM Frequency Division Multiplex
FDMA Frequency Division Multiple Access
HEC Header Error Correction
HFC Hybrid Fiber Coax
ID Identity
LAN Local Area Network
MAC Medium Access Control
MMI Multi-Media Interactive ( a broadband service offered to end-customers)
MPEG Motion Picture Expert Group ( a protocol for compressing video signals)
NID Network Interface Device (A point in the network used for protection and demarcation)
NTC Network Termination Control
OAM Operations, Administration & Maintenance
PPV Pay Per View
QAM Quadrature Amplitude Modulation
PSK Quaternary Phase Shift Keying
RF Radio Frequency
SID Short ID
SONET Synchronous Optical NETwork
STU Set Top Unit
STS Synchronous Timing Signal
TDM Time Divion Multiplex
TDMA Time Division Multiple Access
VBR Variable Bit Rate
VC Virtual Channel
VCI Virtual Channel Identifier
VOD Video On Demand
VP Virtual Path
VPI Virtual Path Identifier

I claim:

1. An ATM-TDMA system, wherein upstream ATM cell slots are dynamically allocated, wherein marshalling is achieved within an upstream cell slot according to the inequality:

$$td+(Im/b)<(Is/b)$$

where:
td is the maximum differential round-trip delay;
Im is the minimum length (in bits) of the marshalling sequence necessary to allow correct marshalling;
b is bit rate of upstream traffic;
Is is the length of cell slot minus guard band.

2. A system according to claim 1, wherein the basestation has control over the timing of cell slot allocation and the timing of marshalling responses, whereby the slot to be used for marshalling is removed from the cell allocation mechanism during marshalling.

3. A method of communicating information between a central station and a plurality of terminals in a distribution network, the method comprising the steps of: at the central station, determining downstream TDM frames, for transmission of distribution information and overhead information from the central station to the plurality of terminals, and upstream TDMA frames, for transmission of information in respective time slots from the terminals to the central station, wherein marshalling is achieved within an upstream cell slot according to the inequality:

$$td+(Im/b)<(Is/b)$$

where:
td is the maximum differential round-trip delay;
Im is the minimum length (in bits) of the marshalling sequence necessary to allow correct marshalling;
b is bit rate of upstream traffic;
Is is the length of cell slot minus guard band.

4. A method according to claim 3, wherein the timing of cell slot allocation and the timing of marshalling responses is controlled by the central station, whereby the slot to be used for marshalling is removed from the cell allocation mechanism for the time during which a marshalling response has been commanded.

* * * * *